US008726582B2

(12) United States Patent
Hahin

(10) Patent No.: US 8,726,582 B2
(45) Date of Patent: May 20, 2014

(54) BREAKAWAY COUPLINGS FOR TRANSPORTATION STRUCTURES

(76) Inventor: Christopher Hahin, Springfield, IL (US)

( * ) Notice: Subject to any disclaimer, the term of this patent is extended or adjusted under 35 U.S.C. 154(b) by 603 days.

(21) Appl. No.: 12/938,018

(22) Filed: Nov. 2, 2010

(65) Prior Publication Data

US 2011/0107585 A1 May 12, 2011

Related U.S. Application Data

(60) Provisional application No. 61/257,514, filed on Nov. 3, 2009.

(51) Int. Cl.
*E04B 1/00* (2006.01)
*F16B 31/02* (2006.01)
*E01F 9/018* (2006.01)
*E01F 9/011* (2006.01)

(52) U.S. Cl.
CPC ............. *F16B 31/021* (2013.01); *E01F 9/0182* (2013.01); *E01F 9/0116* (2013.01)
USPC .................... 52/98; 403/2; 403/186; 403/299; 411/2

(58) Field of Classification Search
CPC ...... F01F 9/0182; F01F 9/0116; F16B 31/021
USPC .......................... 52/98; 403/2, 186, 299; 411/2
See application file for complete search history.

(56) References Cited

U.S. PATENT DOCUMENTS 3,521,413 A * 7/1970 Scott et al. .................... 52/98
3,637,244 A * 1/1972 Strizki ........................... 52/98
3,837,752 A * 9/1974 Shewchuk ................... 403/2
4,638,608 A * 1/1987 Coy .............................. 52/98
4,720,204 A * 1/1988 Johnson ..................... 403/24
4,923,319 A * 5/1990 Dent ............................ 403/2
5,139,381 A * 8/1992 Lubreski et al. .......... 411/433
5,596,845 A * 1/1997 Strizki ......................... 52/98
6,033,169 A * 3/2000 Bettger ....................... 411/433
6,056,471 A * 5/2000 Dinitz ......................... 403/2
6,250,835 B1 * 6/2001 Chamel ...................... 403/2
6,406,240 B1 * 6/2002 Potter ....................... 411/433
8,037,651 B2 * 10/2011 Dent ........................... 52/296
8,061,945 B2 * 11/2011 Smith ........................ 411/267
8,281,531 B2 * 10/2012 Dent ........................... 52/296

OTHER PUBLICATIONS

Kuchma, Dan, Hart, Chris, Hahin, Chris; Drop Weight Testing of Brass Breakaway Couplings, Research Report ICT-11-093, Sep. 2011, Center for Transportation, Champaign, IL.

(Continued)

*Primary Examiner* — William Gilbert
*Assistant Examiner* — Alp Akbasli
(74) *Attorney, Agent, or Firm* — Charles McCloskey

(57) ABSTRACT

A breakaway coupling for joining a generally vertical pole structure to a supporting foundation is provided. The breakaway coupling is provided with a multi-sided, elongated body, which may be square-shaped, hexagonal, or generally polygonal in shape. The multi-sided, elongated body is provided with an upper end and a lower end, an outer surface, and is machined to have an internally threaded bore that extends between the upper end and the lower end of the multi-sided, elongated body. The outer surface of the multi-sided, elongated body of the breakaway coupling is provided with at least one horizontally disposed, circumferential groove extending partially into the multi-sided, elongated body toward the internally threaded bore and also extending to a critical notch depth.

11 Claims, 7 Drawing Sheets

(56) References Cited

OTHER PUBLICATIONS

Rudd, Joe, Banas, Greg, Hahin, Chris; Fatigue Performance of Brass Breakaway Couplings, Research Report FHWA-ICT-12-023, Apr. 2013, Center for Transportation, Champaign, IL.

Putjenter, Joe, Lechtenberger, Karla, Reid, John, Roshenbaugh, Scott, Faller, Ron, Sicking, Dean; Performance Evaluation of Brass Breakaway Couplings, Research Report No. TRP-03-248-10 Rev 1, May 31, 2011, Midwest Roadside Safety Facility Nebraska, Transportation Center, University of Nebraska, Lincoln, NE, USA.

\* cited by examiner

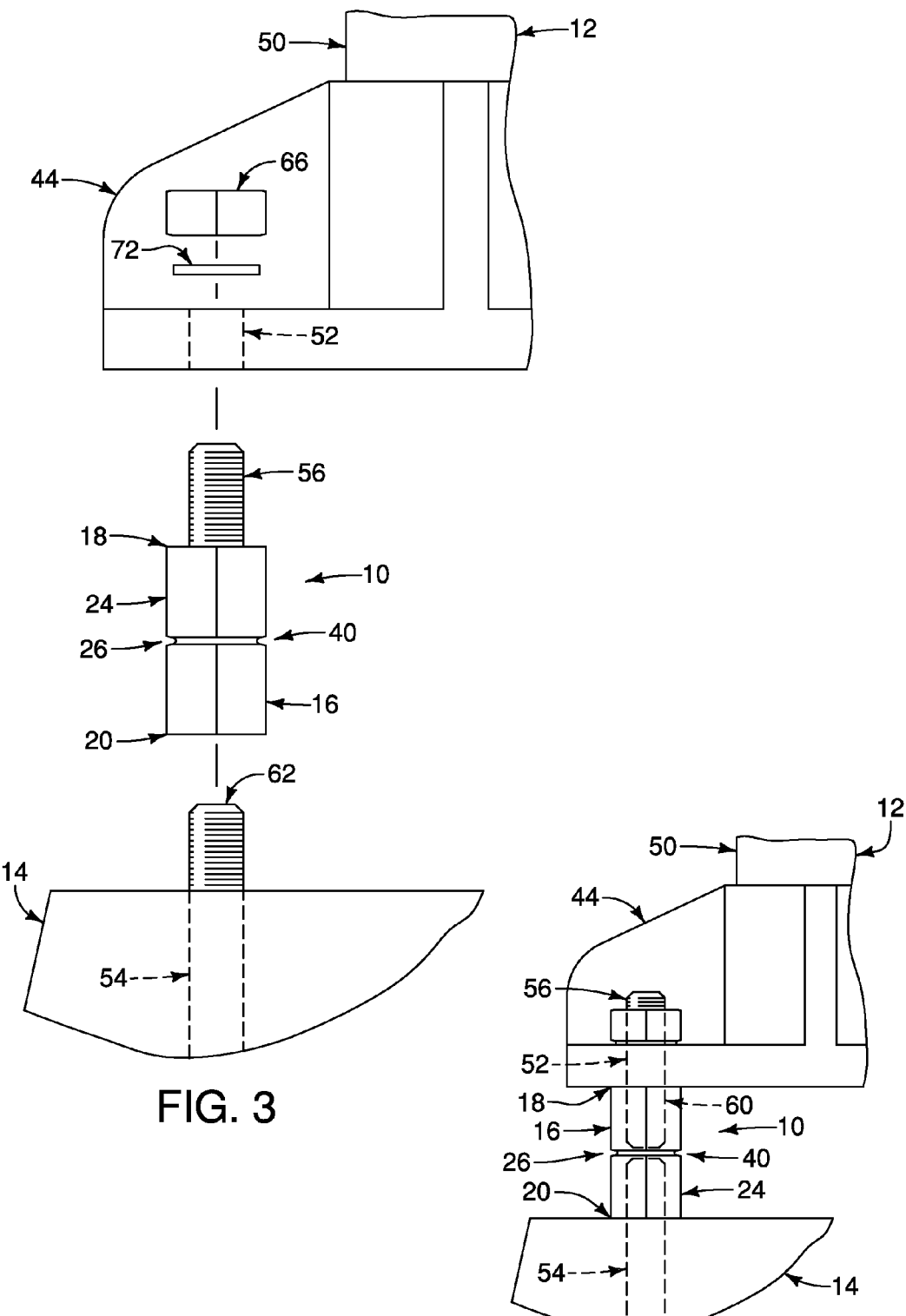

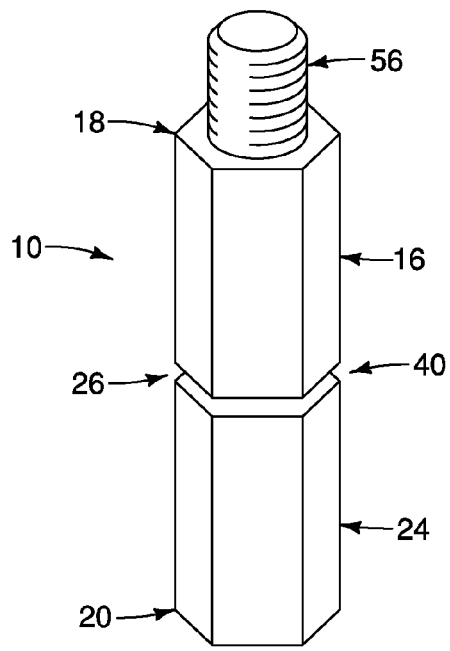
FIG. 5
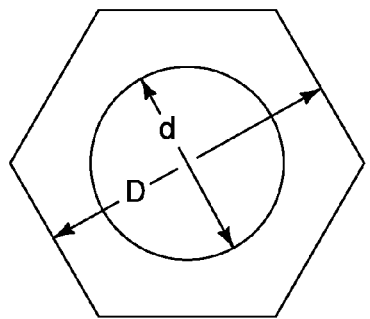
FIG. 6
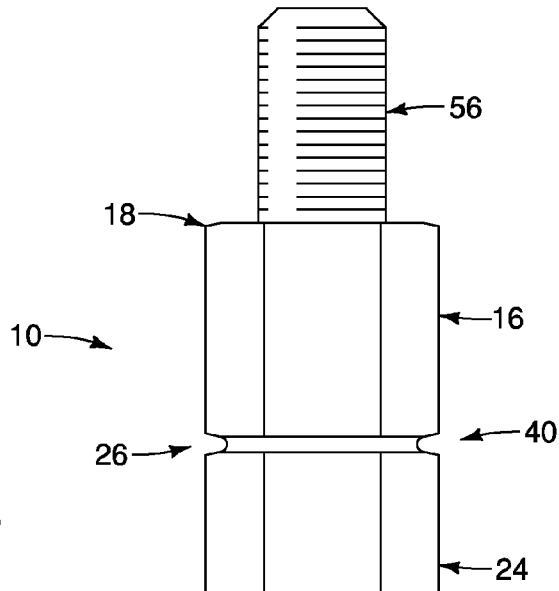
FIG. 7
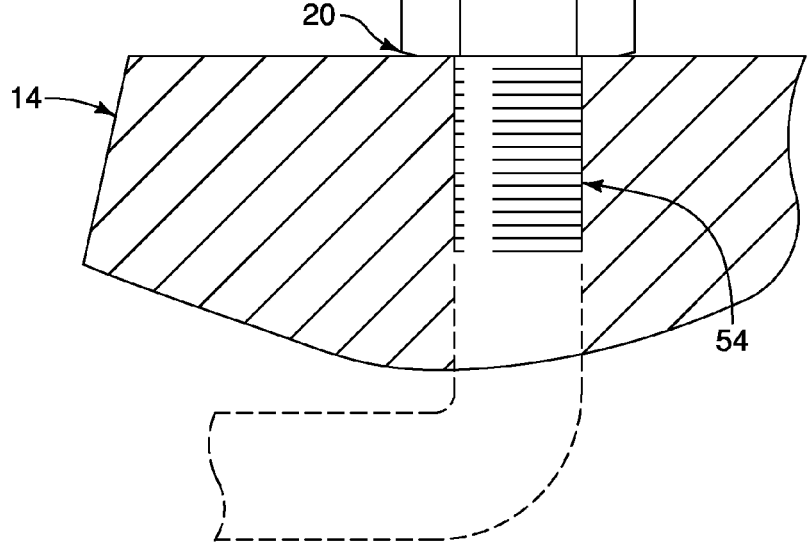

BREAKAWAY COUPLINGS FOR TRANSPORTATION STRUCTURES

This application claims priority to Provisional Application No. 61/257,514, filed on Nov. 3, 2009.

BACKGROUND OF THE INVENTION

This invention relates to new and useful improvements in breakaway couplings for the bases of pole structures. Although the couplings are designed primarily for light poles normally encountered upon streets and roads, other structures such as traffic lights, street signs, display boards and other roadside structures might also employ this invention.

Conventionally, such poles are made of metal, concrete, fiber-reinforced plastic or another such strong and durable material in either a cylindrical or polygonal cross-sectional hollow form. They are normally quite tall in height and usually include an offset portion to support light fixtures. Additionally, the poles are designed to be long-lasting and highly resistant to corrosion and adverse weather conditions, including rain, snow, and normal wind shear.

When a vehicle strikes such a pole, the rapid deceleration of the vehicle normally causes injury to the occupants. If sufficient force is present, the pole is either bent or broken, depending upon the forces of impact and the strength of material used in the manufacture of the pole. Because of their circular or polygonal cross-section, such poles are extremely strong and the vehicle may endure extreme damage as a result of this strength. Such damage often results in injury and/or death to the occupants of vehicles striking such poles.

Many attempts have previously been made to provide breakaway couplings or connectors for the bottom ends of pole structures designed so that the pole structures will break away from their supporting foundations if the pole structures are impacted by a vehicle. Upon impact by a vehicle, these couplings act as weak points, reducing the amount of impact energy the pole structure can absorb, which leads to bending or breaking at a lower overall impact energy. This design results in a pole structure that will bend or break more easily upon vehicular impact, rather than remaining upright and causing further vehicular damage and passenger injury/death. The forward motion of the vehicle also forces the base of the pole structure forward, resulting in a flipping motion that causes the pole structure to gain sufficient height to pass over the roof of the vehicle. In addition to permitting the pole structure to break away from its supporting foundation, the breakaway couplings must also be strong enough to withstand the weight of the pole structure and wind loading. Furthermore, it is advantageous to have breakaway couplings that fail at a specific height sufficient to avoid tearing in the undercarriage of a vehicle. Such tearing can lead to a ruptured fuel tank, which in turn can cause fire and explosion.

There are several types of breakaway couplings found in the prior art and used commercially. For example, U.S. Pat. No. 6,910,826 discloses a breakaway coupling designed with longitudinal slits to enable easy rupture of the coupling when impacted. Although the coupling is designed to be very frangible, the longitudinal grooves enable the coupling to failure along the vertical axis, as opposed to circumferential grooves that would allow horizontal failure. Vertical failure could create problems if the coupling fails incompletely and sections of the coupling are left attached to the supporting foundation bolts. These coupling sections could extend the entire length of the coupling, which would exceed a safe height and could cause tearing of the undercarriage of a vehicle. Furthermore, the longitudinal grooves are prone to develop into cracks that lead to moisture intrusion, intergranular corrosion, galvanic corrosion, and crevice corrosion. This deterioration can cause the coupling itself to easily fracture when subjected to low wind speeds or from incidental forces resulting from very minor vehicle impact. In some cases, the internal corrosion alone can cause failure in the coupling since the corrosion products cause the coupling to split apart. This coupling design has great potential to cause many pole structures to fall down without an impact force, which could cause injuries and traffic stoppage due to blocked highways and expressways.

U.S. Pat. No. 4,638,608 discloses a coupling assembly with numerous interlocking body elements held together by two tension straps located at either end of the coupling. While the ends of the coupling have reduced diameters, the coupling lacks a horizontally disposed notch of any kind. In operation, the coupling is designed to fail at the tension straps. If only the top tension strap fails, the remaining strap could hold the sections of the coupling together, which could cause the coupling to exceed a safe height and cause damage to the underside of a vehicle. Furthermore, the coupling is also susceptible to several types of corrosion at the straps and in between the multiple body elements. Corrosion can cause the entire coupler assembly to fail due to low wind speeds or minor impact force. A corroded coupling can also collapse by bursting apart, causing early failure, which limits this coupling's usefulness in terms of reliability. Finally, this coupling design is dependent on multiple small pieces, which makes the coupling inherently more expensive to manufacture, due to machining costs for each individual piece.

U.S. Pat. Nos. 4,007,564 and 4,052,826 together disclose several types of breakaway coupling assemblies, the most relevant of which is a coupling constructed with surface grooves that extend part of the length of the coupling. Again, this design relies on failure along the vertical axis of the coupling, rather than horizontal failure, as in the case of a horizontal groove. If the vertical grooves cause the coupling to incompletely break apart from the supporting foundation bolts, a long coupling shard could remain to cause damage to the undercarriage of the vehicle. Additionally, the presence of multiple grooves can lead to corrosion and premature failure of the coupling, either from normally negligible wind and impact forces, or from internal failure due to corrosion itself. Since the grooves of the coupling are intricately positioned and sized, this design would increase the machining costs, which would make the coupling more expensive to produce. Furthermore, if the grooves of the coupling are not positioned correctly in relation to the anchor bolts, there is an increased risk of performance issues due to improper installation. The coupling may not fail as desired, leading to an increased amount of effort and associated labor cost required to install the couplings correctly due to the complicated design.

U.S. Pat. No. 3,630,474 discloses a breakaway coupling with a circumferential groove designed to enable the coupling to fail along a horizontal axis upon impact. This design makes the coupling frangible, but only upon a large impact force due to the nature of the internal bore of the coupling. The bore does not extend the entire length of the coupling, leaving a solid metal section of the coupling. This solid section is aligned with the circumferential groove, and upon impact the coupling is designed to fail at this section. Even with the position of the groove, however, a stronger force would be required to break the coupling than if the bore extended the entire coupling length, which could lead to increased vehicle damage and passenger injury. Precise and predictable failure may be unattainable with this design of coupling due to the solid metal core. The coupling may fail incompletely, or leave ragged fragments of solid metal, which severely limits the utility of the coupling. The solid section in the bore can lead to increased tap breakage, which can produce quality control issues. Additionally, tap breakage can lead to machine down time, coupling destruction, and tap replacement, which would increase the overall cost of manufacturing.

U.S. Pat. No. 3,837,752 discloses a breakaway coupling designed with groups of at least one circumferential groove located near the upper and lower ends of the coupling. If only the upper groove(s) fail, the length of coupling left on the supporting foundation anchor bolts would exceed the 4 inch AASHTO standard safe height and could cause tearing and other potential damage to a vehicle or rupture its fuel tank. Additionally, in this design, the anchor bolts are inserted past the circumferential grooves. This specification strengthens the coupling and makes it more resistant to impact, which increases the force required to cause the couplings to fail. In turn, this force is partially absorbed by the vehicle, causing additional damage and potential passenger injury.

Furthermore, typical materials of construction employed in the field can cause additional performance problems for the breakaway couplings described above. For example, breakaway couplings constructed of various steel or aluminum alloys are extremely susceptible to the types of corrosion discussed above, especially when aluminum alloys are paired with carbon steel anchor bolts. These materials are commonly used in the field. Additionally, the impact toughness of steel, plastic and certain aluminum alloys often vary widely with temperature. Over the range of −20 degrees Fahrenheit to 120 degrees Fahrenheit, a temperature range that applies to most of the United States, the impact toughness for some steels can vary as much as 80 ft-lbs. Couplings made of these materials will fail at widely varying impact forces, depending on the outside temperature. Couplings made of very strong materials can remain intact during a high impact collision, causing vehicular damage and extreme passenger injury. Moderate winds could cause the couplings to fail due to corrosion or cyclic fatigue. These typical materials, depending on which alloy is selected, can be difficult to machine, causing excess wear and tear on production equipment. Recycling these typical materials is often not easily feasible, which in combination with the cost of replacing worn machining parts, leads to a relatively higher cost of production.

While the devices of the prior art patents may represent different utilities in the art, there are still many deficiencies. For example, there remains a need for breakaway couplings that are durable enough to withstand the normal conditions of use. Breakaway couplings should be designed to withstand normal wind shear and incidental vehicle impacts. In these situations, it is ideal for the breakaway couplings to remain intact instead of failing prematurely and causing unnecessary vehicle or property damage.

There also remains a need for breakaway couplings that are corrosion resistant. Couplings should be able to withstand exposure to environmental conditions without degrading past the point of being useful. Since these couplings are usually installed outside, they should be manufactured of a material that can withstand rain, salt spray and other wet conditions without corroding and failing prematurely.

There remains a need for breakaway couplings that are also easy to manufacture. These couplings should be of the simplest design possible and made of a material that does not inflict excessive amounts of wear and tear on the machines used to produce them. The material of construction should not only be easily machinable, but precisely machinable as well. Preferably, the material used should also be recyclable to reduce the amount of waste metal and to lower the overall cost of production.

Additionally, there remains a need in the art for breakaway couplings that are easy to install. Breakaway couplings should be designed as simply as possible, without multiple parts to unnecessarily complicate the installation process. Simply constructed breakaway couplings require less time to install and contain less inherent risk of improper adjustment, which helps lessen the risk of performance issues due to improper installation.

Finally, there remains a need in the art for breakaway couplings that are reliable in terms of predictable frangibility. Breakaway couplings should be designed to fail in a predictable way that leaves a short length of coupling on the supporting foundation. This length of coupling should be short enough not to cause additional unnecessary vehicle damage, specifically scraping of the undercarriage and possible fuel tank rupture, which can result in fire and explosion. Breakaway couplings should also fail in a way that leaves a precise and predictable shape of coupling on the foundation, not a ragged, irregular coupling fragment that may cause additional damage. Additionally, these couplings should not be so rigid as to remain intact after a specified impact force. In this situation, the couplings should fail rather than remaining intact and causing additional vehicle damage and passenger injury.

BRIEF SUMMARY OF THE INVENTION

The needs identified above are addressed by the present breakaway coupling for joining a generally vertical pole structure to a supporting foundation designed to fail in a reliable and predictable manner. The coupling is designed with an internally threaded bore that extends the entire length of the coupling, a multi-sided, elongated body and a horizontally disposed, circumferential groove designed to provide a weak point in the coupling. The coupling is strong enough to withstand normal wind shear and incidental impact forces. Conversely, the groove provides a weak point in the coupling that allows it to fracture and fail in a predictable and precise manner when subjected to a predetermined minimal impact force. Additionally, the coupling is constructed from a durable material that is corrosion resistant to prevent premature degradation and failure due to rain, salt spray, and other wet environmental conditions.

Furthermore, the coupling is constructed out of a material that is easy to machine and recycle and also easy to install. The high machinability of free-cutting brass reduces wear on the machines used for production and produces less scrap metal compared to other couplings. The internally threaded through-bore also reduces tap breakage, decreasing the overall cost of manufacture. The multi-sided shape of the coupling can be easily gripped and torqued during the installation process. Because of the overall simplicity of the design, the coupling is generally easy to install, which reduces the risk of premature failure due to improper installation.

One embodiment of the present invention is a breakaway coupling for joining a generally vertical pole structure to a supporting foundation. The breakaway coupling is provided with a multi-sided, elongated body, which may be square-shaped, hexagonal, or generally polygonal in shape. The multi-sided aspect of the elongated body allows for easier handling and stability when manufacturing and installing the coupling. The multi-sided, elongated body is provided with an upper end and a lower end, an outer surface, and is machined to have an internally threaded bore that extends between the upper end and the lower end of the multi-sided, elongated body.

The outer surface of the multi-sided, elongated body of the breakaway coupling is provided with at least one horizontally disposed, circumferential groove extending partially into the multi-sided, elongated body toward the internally threaded bore and also extending to a critical notch depth. This at least one horizontally disposed, circumferential groove allows the breakaway coupling to fail in a specific and reliable manner when a predetermined minimal impact force is applied. The critical notch depth is calculated to ensure that the breakaway coupling fails only under the desired conditions and not prematurely when subjected to lesser forces. The breakaway coupling is made of a durable material to help ensure against premature failure.

In another embodiment, the present invention is a breakaway assembly designed to fail when subjected to a predetermined minimal impact force. The breakaway assembly comprises a generally vertical pole structure with a top end and a bottom end, a pole base connected to the bottom end of the generally vertical pole structure and provided with a plurality of vertically disposed openings, a supporting foundation in a constructive relationship to the pole base with a plurality of foundation anchor bolts extending vertically upwards from the supporting foundation, and a plurality of breakaway couplings made of a free-cutting brass alloy connecting the pole base to the supporting foundation.

The plurality of breakaway couplings individually are provided with a multi-sided, elongated body, which may be square-shaped, hexagonal, or generally polygonal in shape. The multi-sided, elongated body is provided with an upper end and a lower end, an outer surface, and is machined to have an internally threaded bore that extends between the upper end and the lower end of the multi-sided, elongated body. The outer surface of the multi-sided, elongated body is provided with a single horizontally disposed, circumferential groove extending partially into the multi-sided, elongated body toward the internally threaded bore and also extending to a critical notch depth. The single horizontally disposed, circumferential groove allows the plurality of breakaway couplings to fail in a specific and reliable manner when the predetermined minimal impact force is applied. The critical notch depth is of an enabling failure depth that allows the plurality of breakaway couplings to fail only under the desired conditions, upon application of the predetermined minimal impact force, and not prematurely when subjected to lesser forces. Additionally, a critical support depth of an enabling sustained fatigue life thickness in corresponding relation to the single horizontally disposed, circumferential groove is provided. This critical support depth allows the plurality of breakaway couplings to remain durable and functional over time, resulting in a sustained fatigue life and reduced instances of premature failure. A vertically oriented pole base anchor bolt threadably received into the upper end of the multi-sided, elongated body of a corresponding breakaway coupling and secured with a bonding agent is also provided.

Referring to the overall breakaway assembly, the plurality of foundation anchor bolts are individually threadably received into the lower end of the multi-sided, elongated body of the corresponding breakaway coupling to join the plurality of breakaway couplings to the supporting foundation. Additionally, the plurality of vertically disposed openings are individually receivable to the vertically oriented pole base anchor bolt.

Yet another embodiment of the present invention comprises a method for enabling failure of a breakaway assembly when subjected to a predetermined minimal impact force. The breakaway assembly comprises a generally vertical pole structure with a top end and a bottom end, a pole base connected to the bottom end of the generally vertical pole structure and provided with a plurality of vertically disposed openings, a supporting foundation in a constructive relationship to the pole base with a plurality of foundation anchor bolts extending vertically upwards from the supporting foundation, and a plurality of breakaway couplings made of a free-cutting brass alloy connecting the pole base to the supporting foundation.

The plurality of breakaway couplings individually are provided with a multi-sided, elongated body, which may be square-shaped, hexagonal, or generally polygonal in shape. The multi-sided, elongated body is provided with an upper end and a lower end, an outer surface, and is machined to have an internally threaded bore that extends between the upper end and the lower end of the multi-sided, elongated body. The outer surface of the multi-sided, elongated body is provided with a single horizontally disposed, circumferential groove extending partially into the multi-sided, elongated body toward the internally threaded bore and also extending to a critical notch depth. The single horizontally disposed, circumferential groove allows the plurality of breakaway couplings to fail in a specific and reliable manner when the predetermined minimal impact force is applied. The critical notch depth is of an enabling failure depth that allows the plurality of breakaway couplings to fail only under the desired conditions, upon application of the predetermined minimal impact force, and not prematurely when subjected to lesser forces. Additionally, a critical support depth of an enabling sustained fatigue life thickness in corresponding relation to the single horizontally disposed, circumferential groove is provided. This critical support depth allows the plurality of breakaway couplings to remain durable and functional over time, resulting in a long fatigue life and reduced instances of premature failure.

Generally, the method comprises installing the breakaway assembly. The method first comprises threadably inserting a vertically oriented pole base anchor stud bolt into the upper end of the multi-sided, elongated body of a corresponding breakaway coupling and securing the vertically oriented pole base anchor stud bolt with a bonding agent. The method then comprises threadably connecting the lower end of the multi-sided, elongated body of the corresponding breakaway coupling individually around the plurality of foundation anchor bolts. The method thirdly comprises applying a tightening force individually to the plurality of breakaway couplings to secure the plurality of breakaway couplings to the supporting foundation. Fourthly, the method comprises placing the generally vertical pole structure on top of the plurality of breakaway couplings in a way that allows the vertically oriented pole base anchor stud bolt to extend through a corresponding vertically disposed opening in the pole base. The method then comprises threadably connecting a nut around the vertically oriented pole base anchor stud bolt. The method finally comprises applying a securing force to the nut to secure the breakaway assembly and complete the installation process.

BRIEF DESCRIPTION OF THE DRAWINGS

FIG. 3 is an elevational deconstructed view of the breakaway assembly showing the alignment of the assembly components;

FIG. 4 is a side, partial cross-sectional view of the breakaway assembly fully assembled;

FIG. 5 is a top perspective view of the breakaway coupling joined with an anchor bolt;

FIG. 6 is a top, cross-sectional view of the breakaway coupling only;

FIG. 7 is a side view of the breakaway coupling joined with anchor and stud bolts;

DETAILED DESCRIPTION

Figure 1:
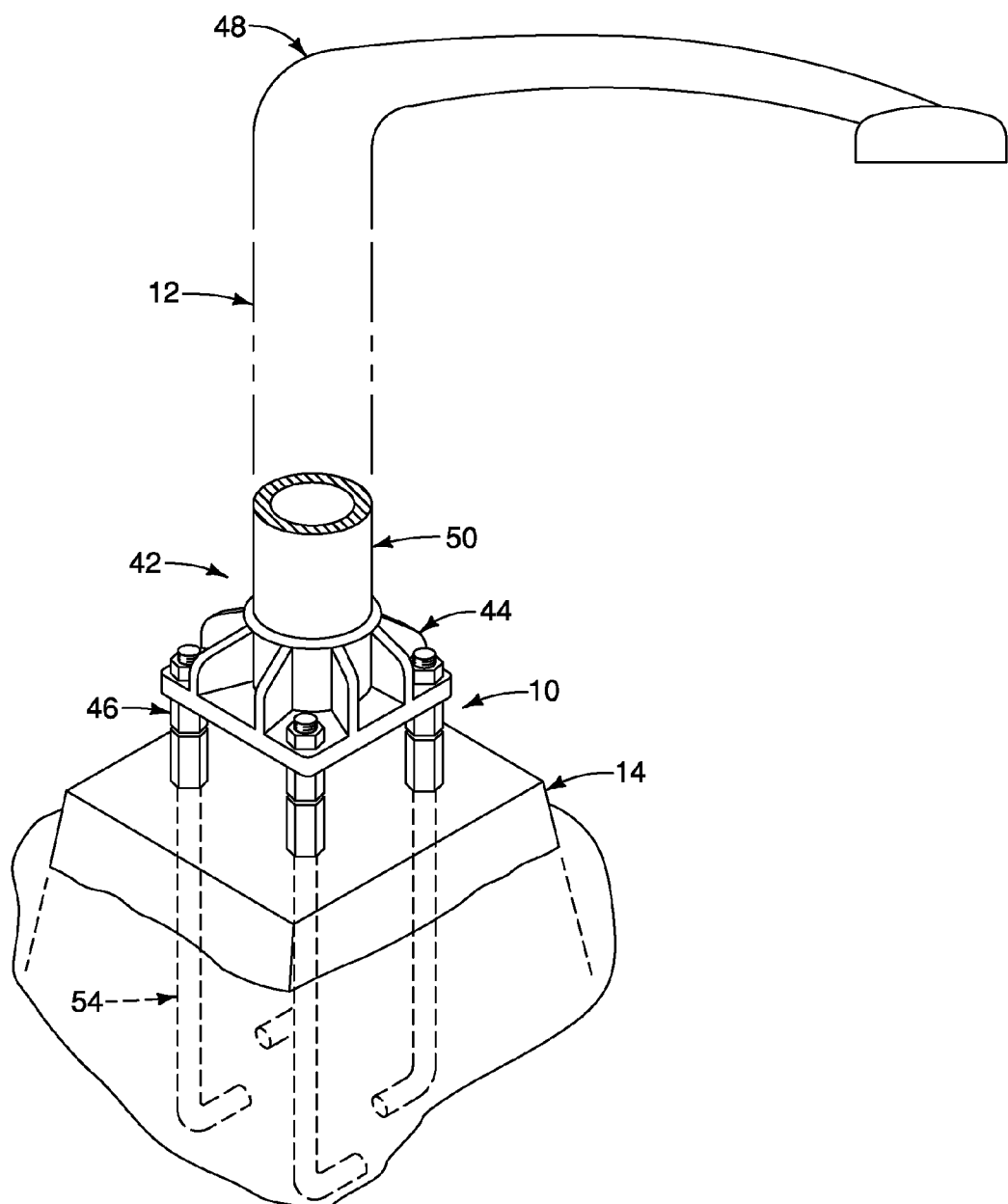
FIG. 1 is a top perspective view of the breakaway assembly.
Figure 2:
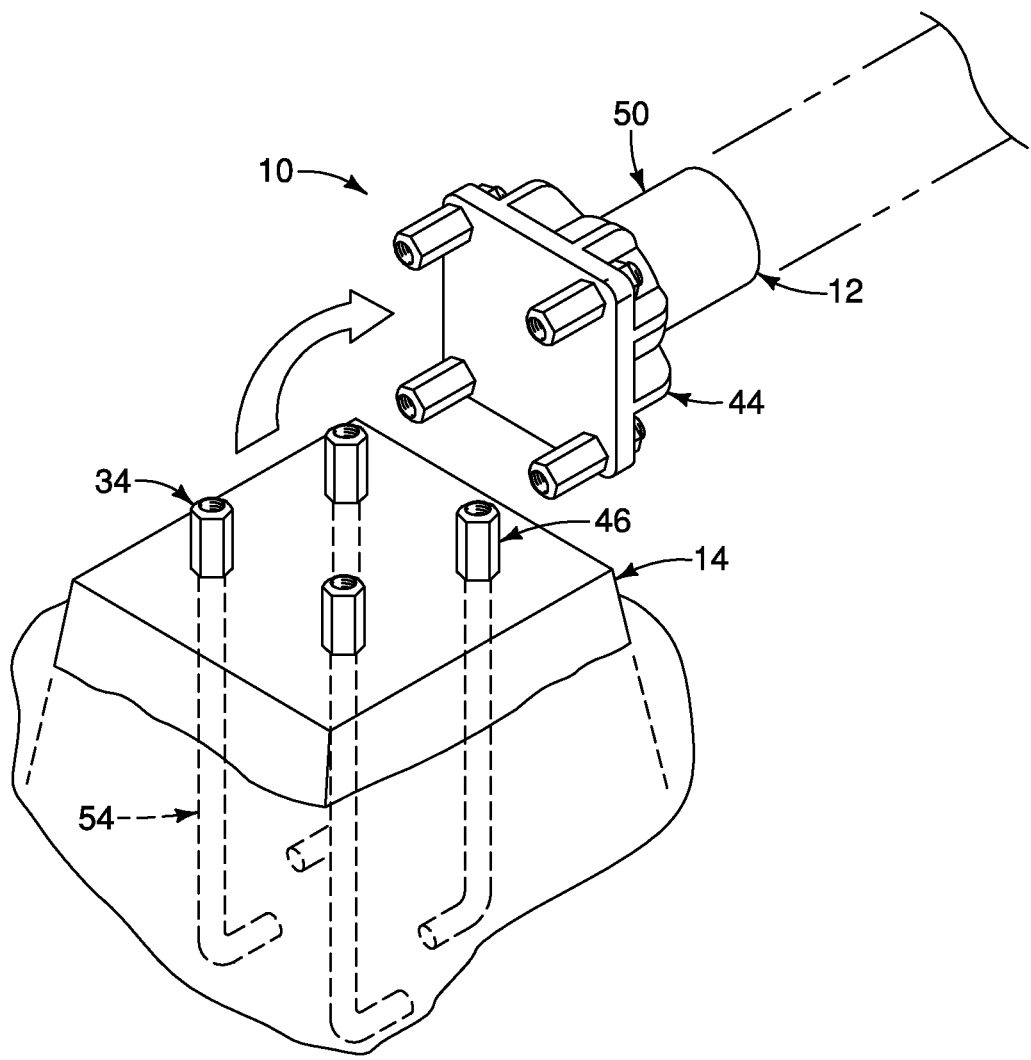
FIG. 2 is a top perspective view illustrating the breakaway assembly after failure of the breakaway couplings.
Figure 8:
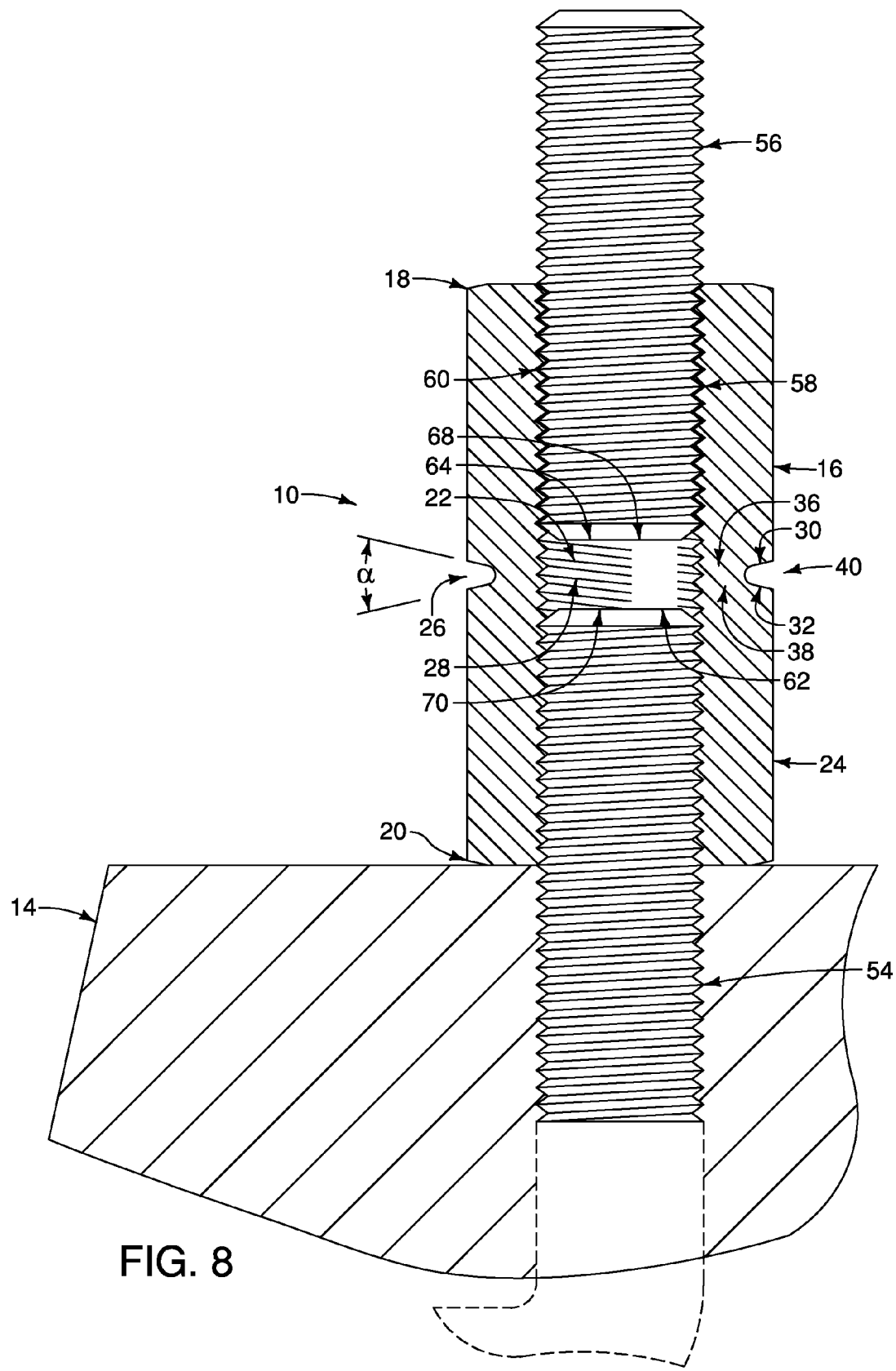
FIG. 8 is a partial cross-sectional view of the breakaway coupling joined with anchor and stud bolts.

Referring now to FIG. 1, a breakaway coupling is generally designated 10 and is made of a durable material. The breakaway coupling 10 is designed for joining a generally vertical pole structure 12 to a supporting foundation 14.

Referring now to FIGS. 2, 5, 6, 7 and 8, the breakaway coupling 10 is provided with a multi-sided, elongated body 16 that extends in a vertical direction and has an upper end 18, a lower end 20, an internally threaded bore 22, and an outer surface 24. The internally threaded bore 22 extends between the upper end 18 and the lower end 20 of the multi-sided, elongated body 16. The design of the internally threaded bore 22 reduces the amount of tap failures in the manufacturing process, decreases metal waste, increases productivity, alleviates various quality control issues and lowers the overall cost of production.

The multi-sided, elongated body 16 should be shaped to allow for easy gripping and application of torque during the installation process. Such a design allows for easy installation and a reduced risk of premature failure due to improper installation. Preferably, the multi-sided, elongated body 16 may be square-shaped, hexagonal, or generally polygonal in shape. In the most preferred embodiment, the multi-sided, elongated body 16 is hexagonal in shape.

The breakaway coupling 10 should be of a sufficient size to support the weight of the generally vertical pole structure 12 and resist normal wind shear and incidental impact forces. Conversely, the breakaway coupling 10 should not be so rigidly constructed that it remains intact after application of a predetermined minimal impact force and cause unnecessary vehicle damage and passenger injury. The predetermined minimal impact force is the force normally required to cause the breakaway coupling 10 to fail upon impact. Typically the predetermined minimal impact force is applied to the generally vertical pole structure 12 in a horizontal direction. A vehicle travelling at highway speed striking the generally vertical pole structure 12 would usually provide more than the necessary predetermined minimal impact force to cause the breakaway coupling 10 to fail; however, the predetermined minimal impact force will vary depending on user specifications. For example, one user may desire a breakaway coupling 10 designed to fail from a mid-size vehicle striking the generally vertical pole structure 12 at 45 miles per hour while another user may desire a breakaway coupling 10 designed to fail from a passenger truck striking the generally vertical pole structure 12 at 65 miles per hour.

Preferably, the entire multi-sided, elongated body 16 is between 3.0 inches and 5.5 inches in height and is provided with a diameter D between 1.25 inches and 1.75 inches while the internally threaded bore 22 is provided with a diameter d between 0.75 inches and 1.25 inches. More preferably, the multi-sided, elongated body 16 is between 3.5 inches and 5.25 inches in height, the diameter D is between 1.375 inches and 1.625 inches, and the diameter d is between 0.875 inches and 1.125. Most preferably, the multi-sided, elongated body 16 is 3.5 inches in height for poles of low mass of 300 to 600 lbs, whereas the elongated body length is 5.25 inches long for poles of high mass of 900 to 1000 lbs, and the diameter D is 1.5 inches and the diameter d is 1.0 inch for both poles.

The outer surface 24 of the multi-sided, elongated body 16 is provided with at least one horizontally disposed, circumferential groove 26 that allows the breakaway coupling 10 to fail in a specific and reliable manner when the predetermined minimal impact force is applied. Since the internally threaded bore 22 extends between the upper end 18 and the lower end 20 of the multi-sided, elongated body 16 of the breakaway coupling 10, the breakaway coupling 10 encounters less resistance to failure when subjected to the predetermined minimal impact force. Thus, the breakaway coupling 10 will fail in a precise and predictable manner. Other breakaway couplings containing a solid metal core often require a stronger force to initiate failure, which can lead to increased vehicle damage and passenger injury. Additionally, such couplings may fail incompletely or leave ragged fragments or projections of solid metal after failure. Preferably, the at least one horizontally disposed, circumferential groove 26 is located at a bolt meeting point 28. The bolt meeting point 28 is most preferably located substantially equal distant between the upper end 18 and the lower end 20 of the multi-sided, elongated body 16; however, it is appreciated that the location of the bolt meeting point 28 may vary in a vertical direction, depending on user specifications.

The at least one horizontally disposed, circumferential groove 26 extends partially into the multi-sided, elongated body 16 towards the internally threaded bore 22 and also extends to a critical notch depth 30. The critical notch depth 30 is preferably of an enabling failure depth 32 to enable failure of the breakaway coupling 10 along the at least one horizontally disposed, circumferential groove 26 upon application of the predetermined minimal impact force. The critical notch depth 30 allows the breakaway coupling 10 to be frangible enough not to remain intact after the predetermined minimal impact force is applied. In this situation, the breakaway coupling 10 should fail rather than remaining intact to cause additional vehicle damage and passenger injury. Additionally, the critical notch depth 30 allows the breakaway coupling 10 to fail in a predictable way that leaves only a coupling remnant 34 on the supporting foundation 14. This coupling remnant 34 should be short enough not to cause additional unnecessary vehicle damage, specifically scraping of the undercarriage and possible fuel tank rupture, which can result in fire and explosion. According to the American Association of State Highway and Transportation Officials standards, the coupling remnant 34 may be no more than 4 inches in length. (*Standard Specifications for Structural Supports for Highway Signs, Luminaires and Traffic Signals,* 4th ed. (2001) Washington, D.C., American Association of State Highway and Transportation Officials, 2006, pp. 12-6). Thus, in the preferred embodiment, the coupling fragment 34 is less than 4 inches in length.

The Barsom-Rolfe relationship and the appropriate stress-intensity factor relationship based on the geometry of the breakaway coupling 10 and the at least one horizontally disposed, circumferential groove 26 may be used to determine the critical notch depth 30 upon impact-initiated fracture, or in other words the enabling failure depth 32 based on application of the predetermined minimal impact force (See Barsom & Rolfe, *Fracture and Fatigue Control in Structures: Applications of Fracture Mechanics,* 3rd Ed., Philadelphia, Butterworth-Heinemann, 1999). The enabling failure depth 32 may alternatively be determined from experimental data. The critical notch depth 30 may also be of either less than or more than the enabling failure depth 32. The enabling failure depth 32 generally is calculated based on a given set of conditions, such as a specific value of the predetermined minimal impact force. Based on geographically varying environmental conditions, and possibly state-specific regulations, the enabling failure depth 32 based on a given set of conditions may not be appropriate. For example, a specific state may require a margin of safety to be added to the critical notch depth 30 based on temperatures, amount of precipitation, or more stringent regulations. Varying the critical notch depth 30 helps to compensate for these factors.

Preferably, the critical notch depth 30 is between 0.125 inches and 0.180 inches. More preferably, the critical notch depth 30 is between 0.130 inches and 0.170 inches. Most preferably, the critical notch depth 30 is between 0.150 and 0.170 inches.

In a preferred embodiment, a critical support depth 36 is provided in addition to the critical notch depth 30. In general, the critical support depth 36 is of an enabling sustained fatigue life thickness 38 to enable a sustained fatigue life of the breakaway coupling 10. This design allows the breakaway coupling 10 to withstand normal wind shear and incidental vehicle impacts less than the predetermined minimal impact force while supporting the weight of the generally vertical pole structure 12 as well. In these situations, it is ideal for the breakaway coupling 10 to remain intact instead of failing prematurely and causing unnecessary vehicle or property damage.

The critical support depth 36 is preferably located in corresponding relation to the at least one horizontally disposed, circumferential groove 26. In the most preferred embodiment, the critical support depth 36 is located between the internally threaded bore 22 and the critical notch depth 30. The critical support depth 36 may also be of either less than or more than the enabling sustained fatigue life thickness 38. Based on geographically varying environmental conditions, and possibly state-specific regulations, the enabling sustained fatigue life thickness 38 for a predetermined set of conditions may not be appropriate. For example, a specific state may require a margin of safety to be added to the critical support depth 36 based on temperatures, amount of precipitation, or more stringent regulations. Varying the critical support depth 36 helps to compensate for these factors.

The at least one horizontally disposed, circumferential groove 26 provides a weak point to initiate fracture of the breakaway coupling 10 upon application of the predetermined minimal impact force. While the at least one horizontally disposed, circumferential groove 26 may comprise of multiple grooves, a single horizontally disposed, circumferential groove 40 is preferred. The single horizontally disposed, circumferential groove 40 helps ensure a single breaking point, allowing for a more precise failure at the bolt meeting point 28 and a more predictable coupling remnant 34 after failure.

The single horizontally disposed, circumferential groove 40 may be machined as a smooth circular cut or an indexed cut, although a smooth circular cut is preferred. The single horizontally disposed, circumferential groove 40 may also be machined as a direct cut with squared-off sides or as a tapered cut with sloped sides. This process may result in a square-shaped or V-shaped single horizontally disposed, circumferential groove 40; however, it is preferred that the single horizontally disposed, circumferential groove 40 is V-shaped. This embodiment best limits the possibility of water or debris becoming trapped in the single horizontally disposed, circumferential groove 40. Acidic water and accumulating debris can cause corrosion damage to other coupling designs.

Preferably, the single horizontally disposed, circumferential, groove 40 forms an angle $\alpha$ of between 0 degrees and 45 degrees. More preferably, the single horizontally disposed, circumferential, groove 40 is V-shaped and the angle $\alpha$ is between 15 degrees and 40 degrees. Most preferably, the single horizontally disposed, circumferential, groove 40 is V-shaped and the angle $\alpha$ is between 25 degrees and 35 degrees.

The breakaway coupling 10 is made of a durable material. The durable material should be corrosion resistant so that the breakaway coupling 10 can withstand exposure to environmental conditions without degrading past the point of being useful. The durable material should be able to withstand rain, salt spray and other wet conditions without corroding and prematurely failing.

The durable material should permit ease of coupling manufacture. The durable material should be both easily and precisely machinable to reduce excessive wear on the machines used and to create precise cuts on the breakaway coupling 10. It is also desired that the durable material be recyclable to reduce the amount of waste metal and to lower the overall cost of production.

The durable material should perform in a consistent manner as well. Ideally, the durable material should have an impact toughness that does not vary widely with external temperature. Since the impact toughness is used to calculate the enabling failure depth 32 based on application of the predetermined minimal impact force, the enabling failure depth 32 would vary with temperature if the impact toughness of the durable material also varies with temperature. This variation could make the breakaway coupling 10 either too rigid or too brittle, depending on temperature.

The durable material is preferably a free-cutting brass alloy. Free-cutting brass is both easily and precisely machinable and does not cause excess wear on the machines used. Free-cutting brass can be recycled relatively easily compared to other materials such as commercial carbon steel, some aluminum alloys or fiber-reinforced plastics. Additionally, over the range of −20 degrees Fahrenheit to 120 degrees Fahrenheit, a temperature range that applies to most of the United States, the impact toughness of free-cutting brass is relatively constant around 14 ft-lbs with a variation of only approximately 1 ft-lb, while the impact toughness of some commercial carbon steels can vary as much as 80 ft-lbs. Finally, free-cutting brass is typically ten times more corrosion resistant than carbon steel.

Preferably, the breakaway coupling 10 is made of a free-cutting brass alloy comprised of between 58% and 65% copper, between 33% and 39% zinc, and between 1% and 5% lead, such that the total percentage does not exceed 100%. More preferably, the breakaway coupling 10 is made of a free-cutting brass alloy comprised of between 59% and 64% copper, between 34% and 38% zinc, and between 2% and 4% lead, such that the total percentage does not exceed 100%. Most preferably, the breakaway coupling 10 is made of a free-cutting brass alloy comprised of between 60% and 63% copper, between 35% and 37% zinc, and 3% lead, such that the total percentage does not exceed 100%. Although a free-cutting brass alloy is the material of choice, it is envisioned that the durable material may also be aluminum, galvanized steel, or another similar durable free-cutting material used in the field.

Referring now to FIGS. 1, 2, 3, 4, 8, 9, and 10, a breakaway assembly is generally designated 42 and is provided as another embodiment to the present invention. The breakaway assembly 42 is designed to fail when subjected to the predetermined minimal impact force and is comprised of the generally vertical pole structure 12, a pole base 44, the supporting foundation 14, and a plurality of breakaway couplings 46.

The generally vertical pole structure 12 may be a light pole, sign post, traffic light, or other general pole structure, and is provided with a top end 48 and a bottom end 50. Preferably, the generally vertical pole structure 12 is made of metal, concrete, or another such strong material in either a cylindrical or polygonal cross-sectional hollow form, although it is understood that the design of the generally vertical pole structure 12 may vary significantly depending user specifications and the geographical location in which the generally vertical pole structure 12 is employed.

The pole base 44 is connected to the bottom end 50 of the generally vertical pole structure 12 and is provided with a plurality of vertically disposed openings 52. The plurality of vertically disposed openings 52 correspond to the number and configuration of the plurality of breakaway couplings 46. The pole base 44 is preferably made of a metal such as aluminum or steel, but may also be constructed of another strong, durable material.

The supporting foundation 14 is in a constructive relationship to the pole base 44 and is preferably constructed of poured concrete, but may also be constructed of another comparably sturdy material. The supporting foundation 14 is provided with a plurality of foundation anchor bolts 54 extending vertically upwards from the supporting foundation 14.

The plurality of breakaway couplings 46 are made of a free-cutting brass alloy and comprise at least one breakaway coupling 10. The plurality of breakaway couplings 46 individually further comprise a vertically oriented pole base anchor stud bolt 56 threadably received into the upper end 18 of the multi-sided, elongated body 16 of a corresponding breakaway coupling 10 and secured with a bonding agent 58. The bonding agent 58 is generally a sealant and is preferably a sealant designed for the permanent locking of threaded fasteners. Preferably, the bonding agent 58 is applied directly to a threaded length 60 of the vertically oriented pole base anchor stud bolt 56. The threaded length 60 of the vertically oriented pole base anchor stud bolt 56 is preferably the portion of the vertically oriented pole base anchor stud bolt 56 that is in direct contact with the multi-sided, elongated body 16 of the corresponding breakaway coupling.

Referring to the breakaway assembly 42, the plurality of foundation anchor bolts 54 are preferably individually threadably received into the lower end 20 of the multi-sided, elongated body 16 of the corresponding breakaway coupling 10. The plurality of vertically disposed openings 52 are individually receivable to the vertically oriented pole base anchor stud bolt 56, which is threadably received into the upper end 18 of the multi-sided, elongated body 16 of the corresponding breakaway coupling 10. In this manner, the plurality of breakaway couplings 46 connects the pole base 44 to the supporting foundation 14.

Figure 9:
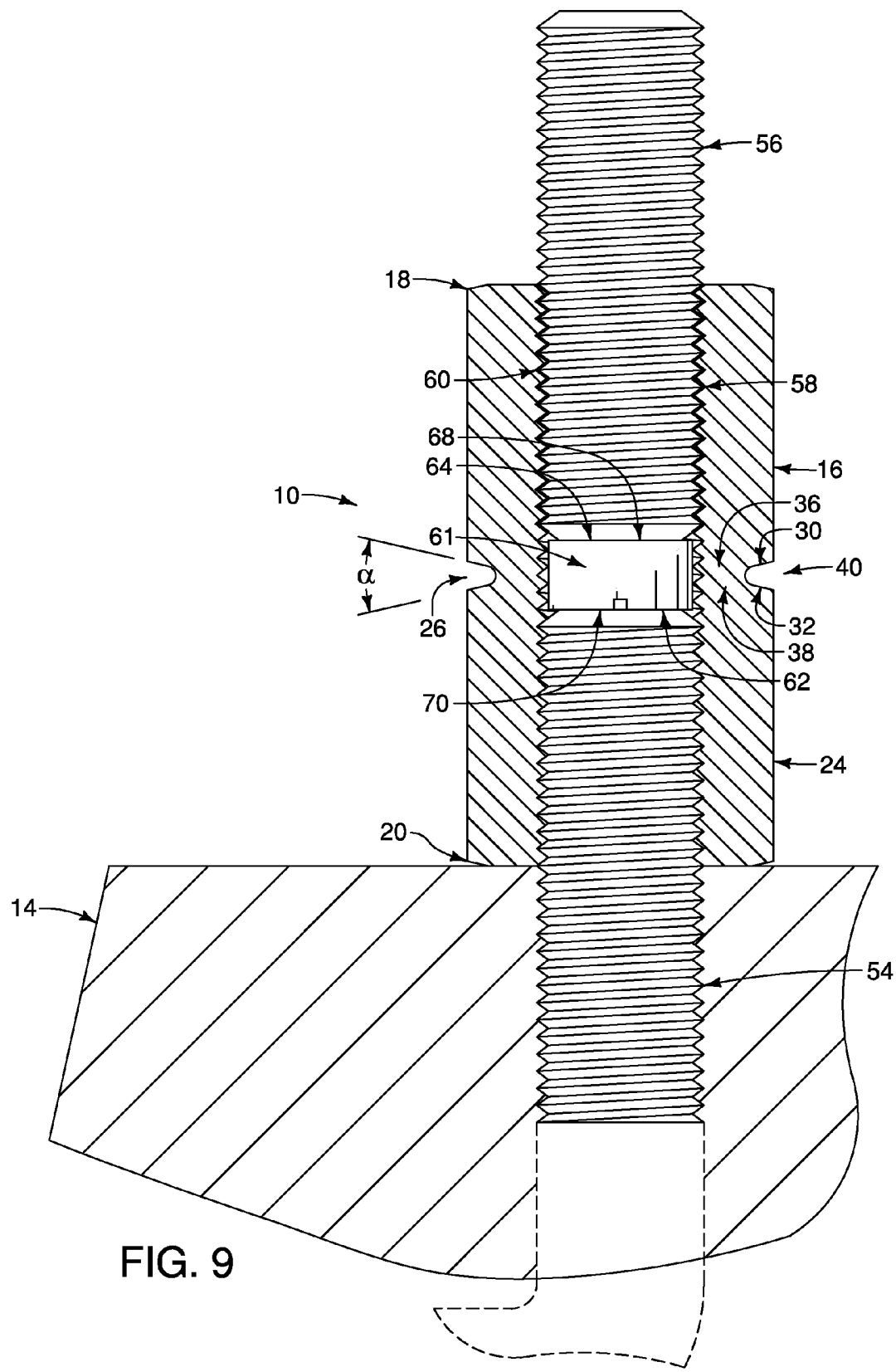
FIG. 9 is a partial cross-sectional view of the breakaway coupling joined with anchor and stud bolts and containing a plastic insert.

Now referring specifically to FIG. 9, in an optional embodiment, a plastic insert 61 is inserted into the corresponding breakaway coupling 10 to the bolt meeting point 28. In the preferred embodiment of this optional embodiment, the plastic insert 61 is externally threaded to be threadably inserted into the corresponding breakaway coupling 10. The plastic insert 61 provides a means for controlling fracture of the corresponding breakaway coupling 10 by controlling the position of the vertically oriented pole base anchor bolt 56 and the plurality of foundation anchor bolts 54. Preferably, the plastic insert 61 is between 0.50 inches and 0.55 inches in height and contains a means for insertion, such as a slot receivable to a screwdriver. The plastic insert 61 should be constructed of a durable material, such as styrene or another similar plastic with minimal energy absorption.

Figure 10:
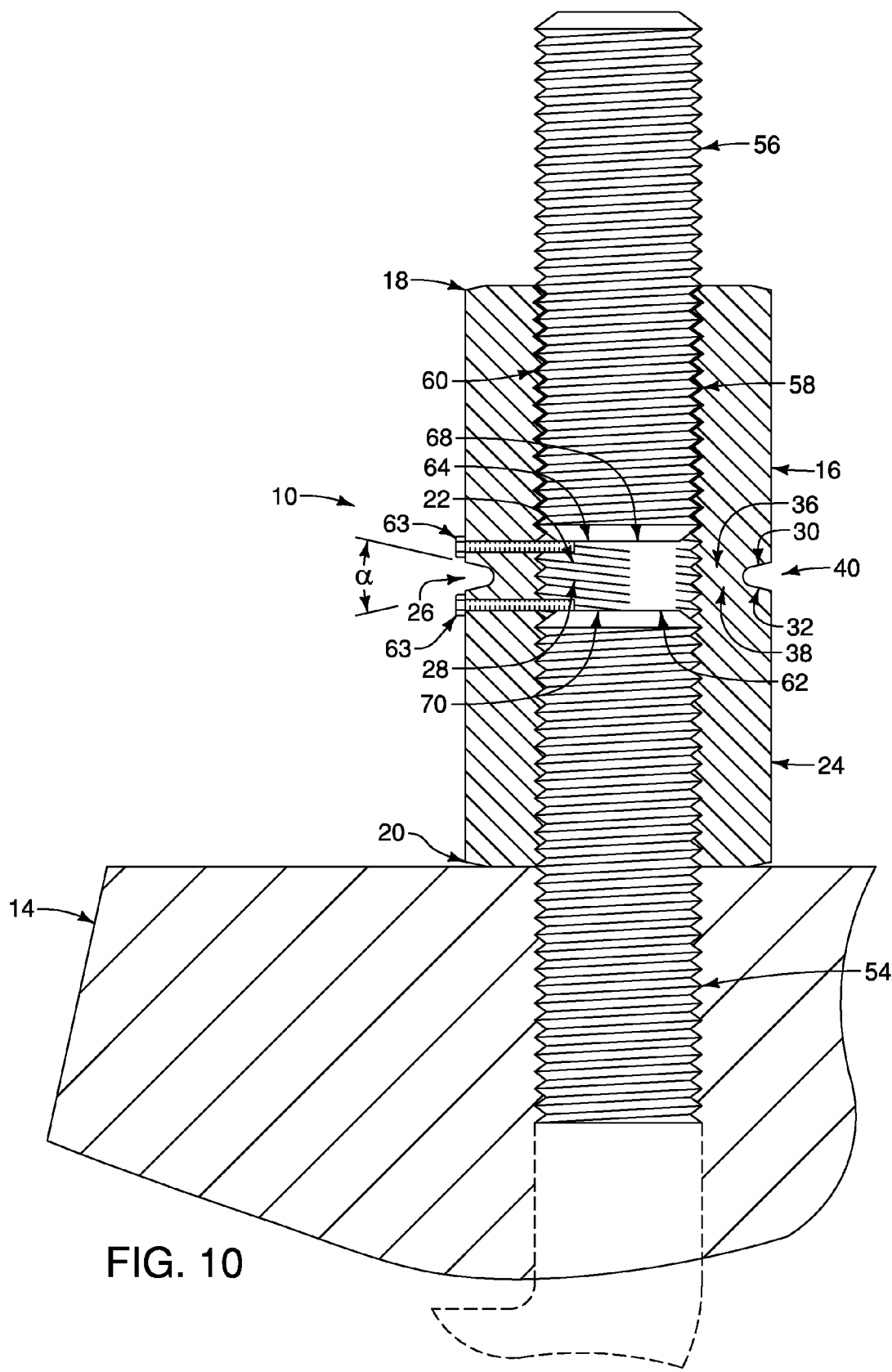
FIG. 10 is a partial cross-sectional view of the breakaway coupling joined with anchor and stud bolts and containing set screws.

Referring specifically to FIG. 10, in another optional embodiment, a set screw 63 is inserted into the corresponding breakaway coupling 10 above the single horizontally disposed, circumferential groove 40. This set screw 63 provides a means for controlling the position of the vertically oriented pole base anchor stud bolt 56. Additionally, in this optional embodiment, a set screw 63 is also inserted into the corresponding breakaway coupling 10 below the single horizontally disposed, circumferential groove 40. This set screw 63 provides a means for controlling the position of the foundation anchor bolts 54. Controlling the position of the vertically oriented pole base anchor bolt 56 and the foundation anchor bolts 54 provides a means for controlling the fracture of the corresponding breakaway coupling 10. Preferably, each set screw 63 is between 0.375 inches and 0.5 inches in length. Each set screw 63 should be constructed of a durable material, such as stainless steel or black oxide alloy steel or another similar metal alloy.

In the most preferred embodiment, the single horizontally disposed, circumferential groove 40 is located at the bolt meeting point 28 formed where a topical point 62 of the plurality of foundation anchor bolts 54 is in relational proximity to a feeding point 64 of the vertically oriented pole base anchor stud bolt 56. The topical point 62 of the plurality of foundation anchor bolts 54 is preferably threadably received into the lower end 20 of the multi-sided, elongated body 16 of the corresponding breakaway coupling 10 while the feeding point 64 of the vertically oriented pole base anchor stud bolt 56 is threadably received into the upper end 18 of the multi-sided, elongated body 16 of the corresponding breakaway coupling 10 to form the bolt meeting point 28. The bolt meeting point 28 preferably creates a gap or space in corresponding relation to the single horizontally disposed, circumferential groove 40, which helps create precise failure of the corresponding breakaway coupling 10 upon application of the predetermined minimal impact force.

Referring now to FIGS. 1, 2, 3, 4, 8, 9, and 10, a method for enabling failure of the breakaway assembly 42 when subjected to the predetermined minimal impact force is provided as yet another embodiment of the present invention. Generally, the method comprises installing the breakaway assembly 42 designed to fail when subjected to the predetermined minimal impact force.

The method first comprises threadably inserting the vertically oriented pole base anchor stud bolt 56 into the upper end 18 of the multi-sided, elongated body 16 of the corresponding breakaway coupling 10 and securing the vertically oriented pole base anchor bolt 56 with the bonding agent 58. The method then comprises threadably connecting the lower end 20 of the multi-sided, elongated body 16 of the corresponding breakaway coupling 10 individually around the plurality of foundation anchor bolts 54. The method thirdly comprises applying a tightening force individually to the plurality of breakaway couplings 46 to secure the plurality of breakaway couplings 46 to the supporting foundation 14. Fourthly, the method comprises placing the generally vertical pole structure 12 on top of the plurality of breakaway couplings 46 in a way that allows the vertically oriented pole base anchor stud bolt 56 to extend through a corresponding vertically disposed opening 52 in the pole base 44. The method then comprises threadably connecting a nut 66 around the vertically oriented pole base anchor stud bolt 56. Preferably, the nut 66 is constructed of a strong, corrosion resistant metal or alloy such as stainless steel. The method finally comprises applying a securing force to the nut 66 in order to secure the breakaway assembly 42 to complete the installation process.

Preferably, the tightening force applied individually to the plurality of breakaway couplings 46 is between 45 ft-lbs and 55 ft-lbs, but may vary significantly depending on user specifications and installation conditions. Similarly, the securing force applied to the nut 66 is preferably between 45 ft-lbs and 55 ft-lbs, but may vary significantly depending on user specifications and installation conditions.

In the preferred embodiment, the method further comprises threadably inserting the vertically oriented pole base anchor stud bolt 56 into the upper end 18 of the multi-sided, elongated body 16 of the corresponding breakaway coupling 10 to an insert point 68. In other words, the insert point 68 is the location of the feeding point 64 of the vertically oriented pole base anchor stud bolt 56 after threadably inserting the vertically oriented pole base anchor bolt 56 into the upper end 18 of the multi-sided, elongated body 16 of the corresponding breakaway coupling 10 and is preferably in close relational proximity to the single horizontally disposed, circumferential groove 40. In the most preferred embodiment, the insert point 68 is located at a point before, not equal to or past, the single horizontally disposed, circumferential groove 40.

Additionally in the preferred embodiment, the method further comprises threadably connecting the lower end 20 of the multi-sided, elongated body 16 of the corresponding breakaway coupling 10 individually around the plurality of foundation anchor bolts 54 to an embedded point 70. In other words, the embedded point 70 is the location of the topical point 62 of the plurality of foundation anchor bolts 54 after threadably connecting the lower end 20 of the multi-sided, elongated body 16 of the corresponding breakaway coupling 10 individually around the plurality of foundation anchor bolts 54 and is preferably in close relational proximity to the single horizontally disposed, circumferential groove 40. In the most preferred embodiment, the embedded point 70 is located at a point before, not equal to or past, the single horizontally disposed, circumferential groove 40.

Preferably, the method further comprises inserting the plastic insert 61 into the corresponding breakaway coupling 10 to the bolt meeting point 28. In the most preferred embodiment, the method comprises threadably inserting the plastic insert 61 that is externally threaded into the corresponding breakaway coupling 10. The plastic insert 61 limits the plurality of foundation anchor bolts 54, which limits the potentially damaging tensile forces on the single horizontally disposed, circumferential groove 40 during application of the tightening force to the plurality of breakaway couplings 46.

Alternatively, the method preferably comprises inserting a set screw 63 into the corresponding breakaway coupling 10 above the single horizontally disposed, circumferential groove 40. This set screw 63 limits the potentially damaging tensile forces on the single horizontally disposed, circumferential groove 40 during application of the tightening force to the plurality of breakaway couplings 46 by controlling the position of the vertically oriented pole base anchor stud bolt 56. Additionally, the method comprises inserting a set screw 63 into the corresponding breakaway coupling 10 below the single horizontally disposed, circumferential groove 40. This set screw 63 further limits the potentially damaging tensile forces on the single horizontally disposed, circumferential groove 40 during application of the tightening force to the plurality of breakaway couplings 46 by controlling the position of the foundation anchor bolts 54.

Preferably, the method further comprises feeding at least one washer 72 around the vertically oriented pole base anchor stud bolt 56. The at least one washer 72 may be fed either above the pole base 44, below the pole base 44, or a combination of above and below the pole base 44, and is generally provided to level the breakaway assembly 42 during the installation process. The at least one washer 72 is preferably constructed of stainless steel, but may be constructed of another durable material used in the field as well. It is also feasible that cutting or grinding of the plurality of breakaway couplings 46 may be employed to achieve levelness of the breakaway assembly 42 if the plurality of foundation anchor bolts 54 is markedly unequal in height or in the number of exposed threads.

While several particular embodiments of the present breakaway coupling have been described herein, it will be appreciated by those skilled in the art that changes and modifications may be made thereto without departing from the invention in its broader aspects and as set forth in the following claims.

What is claimed is:

1. A breakaway coupling made of a durable material for joining a generally vertical pole structure to a supporting foundation, the breakaway coupling comprising:
   a multi-sided, elongated body of single piece construction;
   said multi-sided, elongated body having an upper end, a lower end, an internally threaded bore extending between said upper end and said lower end of said multi-sided, elongated body, and an outer surface;
   said outer surface having at least one horizontally disposed, circumferential groove extending partially into said multi-sided, elongated body towards said internally threaded bore and extending to a critical notch depth;
   said critical notch depth is of an enabling failure depth to enable failure of the breakaway coupling only along said at least one horizontally disposed, circumferential groove upon application of a predetermined minimal impact force; and wherein
   the durable material is a free-cutting brass alloy with a composition of 58-65% copper, 33-39% zinc and 1-5% lead.

2. The breakaway coupling of claim 1, wherein said at least one horizontally disposed, circumferential groove is located at a bolt meeting point.

3. The breakaway coupling of claim 2, wherein said bolt meeting point is located substantially equal distant between said upper end and said lower end of said multi-sided, elongated body.

4. The breakaway coupling of claim 3, wherein the at least one horizontally disposed, circumferential groove is a single horizontally disposed, circumferential groove having a V-shape of an angle of between 5 degrees and 45 degrees and wherein said critical notch depth is between 0.125 inches and 0.170 inches.

5. The breakaway coupling of claim 4, wherein said multi-sided, elongated body is between 3.0 inches and 3.5 inches in length and between 1.25 inches and 1.75 inches in diameter, and wherein said internally threaded bore is between 0.75 inches and 1.25 inches in diameter.

6. A breakaway assembly designed to fail when subjected to a predetermined minimal impact force, the breakaway assembly having a generally vertical pole structure having a top end and a bottom end, a pole base connected to said bottom end of said generally vertical pole structure and provided with a plurality of vertically disposed openings, a supporting foundation in a constructive relationship to said pole base and having a plurality of foundation anchor bolts extending vertically upwards from said supporting foundation, wherein the improvement comprises:

a plurality of breakaway couplings made of a free-cutting brass alloy with a composition of 58-65% copper, 33-39% zinc, and 1-5% lead, connecting said pole base to said supporting foundation;

wherein said plurality of breakaway couplings individually comprise of:

a multi-sided, elongated body;

said multi-sided, elongated body having an upper end, a lower end, an internally threaded bore extending between said upper end and said lower end of said multi-sided, elongated body, and an outer surface;

said outer surface having a single horizontally disposed, circumferential groove extending partially into said multi-sided, elongated body towards said internally threaded bore and extending to a critical notch depth, wherein said critical notch depth is of an enabling failure depth;

a critical support depth of an enabling sustained fatigue life thickness, in corresponding relation to said single horizontally disposed, circumferential groove; and said upper end of said multi-sided, elongated body is adapted to receive a vertically oriented pole base anchor bolt threadably engaged therein and secured with a bonding agent.

7. The breakaway assembly of claim 6, wherein said lower end of said multi-sided, elongated body is adapted to receive a foundation anchor bolt threadably engaged therein and wherein said plurality of vertically disposed openings are individually receivable to said vertically oriented pole base anchor bolt.

8. The breakaway assembly of claim 7, wherein said single horizontally disposed, circumferential groove is located at a bolt meeting point formed where a topical point of said plurality of foundation anchor bolts is in relational proximity to a feeding point of said vertically oriented pole base anchor bolt.

9. The breakaway assembly of claim 8, wherein said bolt meeting point is located substantially equal distant between said upper end and said lower end of said multi-sided, elongated body.

10. The breakaway assembly of claim 9, wherein said single horizontally disposed, circumferential groove is V-shaped of an angle of between 5 degrees and 45 degrees and wherein said critical notch depth is between 0.125 inches and 0.170 inches.

11. A breakaway coupling made of a durable material for joining a generally vertical pole structure to a supporting foundation, the breakaway coupling comprising:

a multi-sided, elongated body of single piece construction;

said multi-sided, elongated body having an upper end, a lower end, an internally threaded bore extending between said upper end and said lower end of said multi-sided, elongated body, and an outer surface;

said outer surface having at least one horizontally disposed, circumferential groove extending partially into said multi-sided, elongated body towards said internally threaded bore and extending to a critical notch depth, said critical notch depth is of an enabling failure depth to enable failure of the breakaway coupling only along said at least one horizontally disposed, circumferential groove upon application of a predetermined minimal impact force and said critical support depth is of an enabling sustained fatigue life thickness to enable a sustained fatigue life of the breakaway coupling;

wherein said at least one horizontally disposed, circumferential groove is located at a bolt meeting point substantially equal distant between said upper end and said lower end of said multi-sided, elongated body;

said at least one horizontally disposed, circumferential groove is a single horizontally disposed, circumferential groove having a V-shape of an angle of between 5 degrees and 45 degrees and wherein said critical notch depth is between 0.125 inches and 0.170 inches; and, said multi-sided, elongated body is a free-cutting brass alloy with a composition of 58-65% copper, 33-39% zinc and 1-5% lead.

\* \* \* \* \*